M. HANSEN.
Scroll-Sawing Machines.

No. 141,048. Patented July 22, 1873.

Witnesses
J. L. Boone
C. M. Richardson

Marquard Hansen
per Dewey & Co.
Attys

UNITED STATES PATENT OFFICE.

MARQUARD HANSEN, OF SAN FRANCISCO, CALIFORNIA.

IMPROVEMENT IN SCROLL-SAWING MACHINES.

Specification forming part of Letters Patent No. 141,048, dated July 22, 1873; application filed February 3, 1873.

*To all whom it may concern:*

Be it known that I, MARQUARD HANSEN, of San Francisco city and county, State of California, have invented an Improvement in Scroll-Sawing Machines; and I do hereby declare the following description and accompanying drawings are sufficient to enable any person skilled in the art or science to which it most nearly appertains to make and use my said invention or improvement without further invention or experiment.

My invention relates to improvements in hanging scroll or jig saws, and also in adjusting the table upon which the work to be sawed is laid.

In order to properly explain my invention so that others will understand its construction and operation, reference is had to the accompanying drawings forming a part of this specification, in which—

Figure 1:
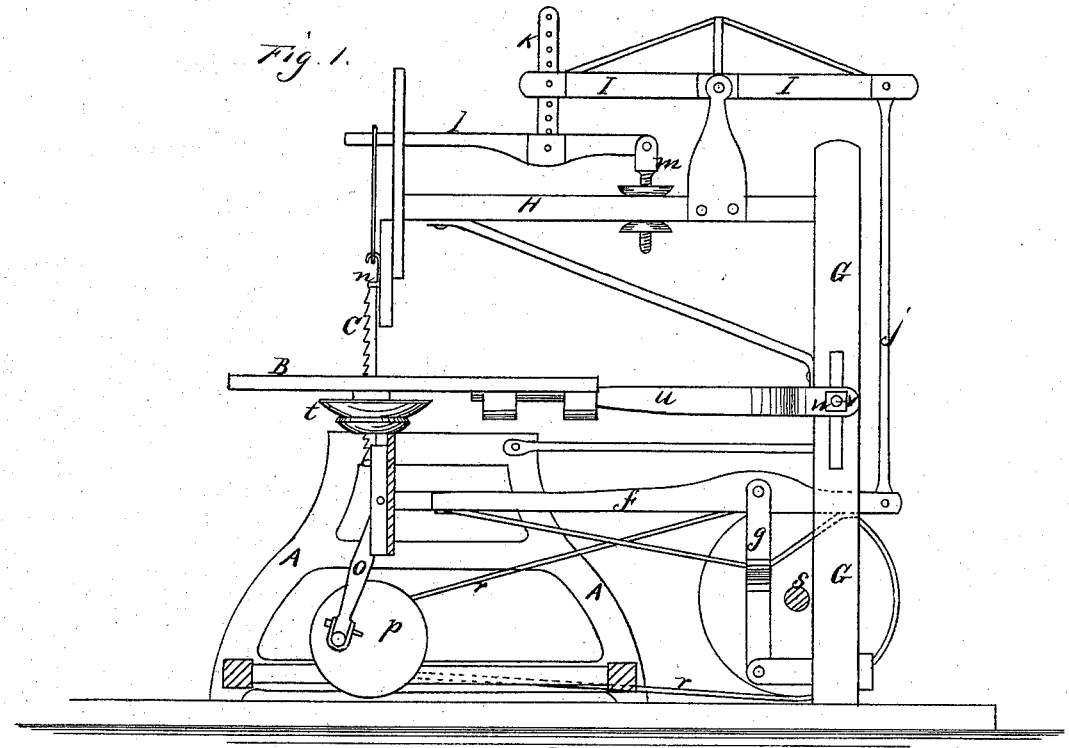
Figure 2:
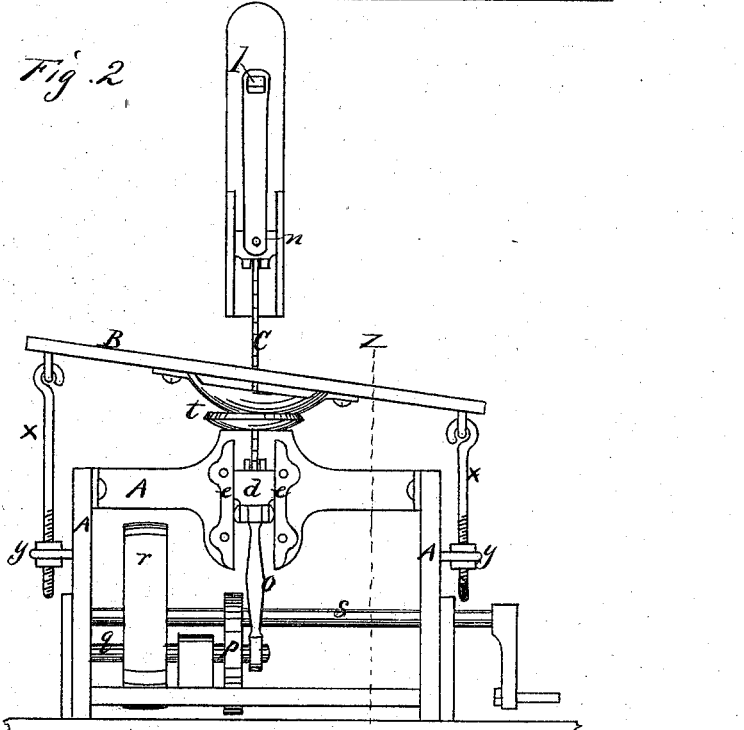

Figure 1 is a side sectional view of my machine taken through Fig. 2. Fig. 2 is a front view.

A represents the table-frame, and B the table-top, through which the scroll-saw C passes. G is the vertical, and H the horizontal, timbers of the frame, which support the upper parts of the saw mechanism. The lower end of the saw C is secured to a sliding block, $d$, which moves between two vertical guides, $e\ e$, below the table-top B. This sliding block is secured to the forward end of a rocking lever, $f$, which is supported by journals at the upper end of a vertical link-connection, $g$, between its middle and rear end. The rear end of the lever $f$ passes through a slot in the vertical timber G, and its extremity is connected with one end of the walking-beam I, on the top of the horizontal timber H of the supporting-frame, by a vertical connecting-rod, $j$. The forward end of this walking-beam is connected by an adjustable link, K, with the middle of a wooden spring-bar, $l$. The forward end of this spring-bar projects out over the saw, and is connected with the slide $n$, to which the upper end of the saw is attached. The rear end of the spring-bar is loosely attached to the upper end of a screw-bolt, $m$, which can be set up or down, according to the length of stroke it is desired to give the saw.

Thus it will be seen that a series of connected vibrating levers connect the upper and lower ends of the saw, so that when the saw is in motion it will have a uniform tension.

Motion is imparted to the saw by a pitman, $o$, which connects the lower sliding block with a crank-wheel, $p$, on the short shaft $q$ below, and the shaft $q$ is driven by a belt, $r$, from the main driving-shaft $s$. The table-top B is supported upon the table-frame A, in a ball-and-socket bearing at $t$, directly below the saw, through an opening, in which bearing the saw passes. This bearing permits the table-top to be tipped in any direction it may be desired, in order to accommodate the work to be done. A bar, $u$, is secured to the bottom of the table, and extends back horizontally to the upright timber G, to which its opposite end is attached by a bolt, V, which passes through a slot in the upright timber G, and is secured by a nut, W. By loosening this nut the bolt can be moved up and down in the slot, so as to adjust the table to the desired plane, while the sides can be adjusted to the desired angle by the pendent rods $x$ and set-nuts $y$.

By this means I provide a strong and substantial scroll-sawing machine. The arrangement of the connected levers will ease the saw from sudden strains and keep a uniform strain upon it.

Having thus described my invention, what I claim, and desire to secure by Letters Patent, is—

1. The arrangement of the rocking lever $f$, with its end block $d$ moving in the slides $e\ e$, in combination with the connecting-rod $j$, walking-beam I, adjustable link K, spring-bar $l$, and upper slide $n$, substantially as and for the purpose above described.

2. The table-top B, with its ball-and-socket bearing $t$, in combination with the adjusting-rods $x\ y$, bolt V, and nut W, substantially as and for the purpose above described.

In witness whereof I hereunto set my hand and seal.

MARQUARD HANSEN. [L. S.]

Witnesses:
J. L. BOONE,
C. M. RICHARDSON.